United States Patent [19]
Koester et al.

[11] Patent Number: 5,571,263
[45] Date of Patent: Nov. 5, 1996

[54] HYDRAULIC ENGINE MOUNT WITH REDUCED IMPULSE VIBRATION

[75] Inventors: David J. Koester, Miamisburg; Michael G. Zimmerman, Spring Valley; Frederick C. Miller, Beavercreek; Robert D. Milos, III, Kettering, all of Ohio

[73] Assignee: General Motors Corporation, Detroit, Mich.

[21] Appl. No.: 422,399

[22] Filed: Apr. 14, 1995

[51] Int. Cl.⁶ .................................................. F16M 1/00
[52] U.S. Cl. ..................... 267/140.13; 267/219; 248/636
[58] Field of Search .............................. 267/140.13, 219, 267/141, 141.2; 248/562, 636; 180/300, 312, 902

[56] References Cited

U.S. PATENT DOCUMENTS

| | | | |
|---|---|---|---|
| 4,159,091 | 6/1979 | Le Salver et al. | 248/562 |
| 4,422,779 | 12/1983 | Hamaekers et al. | 267/140.13 X |
| 4,483,521 | 11/1984 | Kakimoto | 267/8 R |
| 4,588,173 | 5/1986 | Gold et al. | 267/140.1 |
| 4,648,576 | 3/1987 | Matsui | 248/550 |
| 4,679,777 | 7/1987 | Gold et al. | 267/140.1 |
| 4,765,601 | 8/1988 | Miller et al. | 267/140.1 |
| 4,783,063 | 11/1988 | Probst et al. | 267/140.1 |
| 4,787,611 | 11/1988 | Sciortino | 267/140.1 |
| 4,789,142 | 12/1988 | Hoying et al. | 267/140.1 |
| 4,796,876 | 1/1989 | Sciortino | 267/140.1 |
| 4,932,636 | 6/1990 | Phillips et al. | 267/140.1 |
| 5,143,358 | 9/1992 | Hibi et al. | 267/140.13 X |
| 5,145,156 | 9/1992 | Muramatsu et al. | 267/140.14 |
| 5,246,211 | 9/1993 | Klein et al. | 267/140.13 |
| 5,386,973 | 2/1995 | Brenner et al. | 267/140.13 X |
| 5,443,245 | 8/1995 | Bellamy et al. | 267/140.13 X |

*Primary Examiner*—Lee W. Young
*Attorney, Agent, or Firm*—Jeffrey A. Sedlar

[57] ABSTRACT

In a hydraulic mount the use of multiple primary orifices with unequal area reduces the effects of rapid transitions in dynamic rigidity and the amplitude of impulsive vibration generated thereby. This invention's reduced impulsive vibration has lead to the substantial elimination of mode transition related noise in associated vehicle structures in the 200 Hz to 500 Hz range.

7 Claims, 3 Drawing Sheets

HYDRAULIC ENGINE MOUNT WITH REDUCED IMPULSE VIBRATION

BACKGROUND OF THE INVENTION

The present invention relates to hydraulic mounts for damping vibrations.

A variety of mount assemblies are presently available to isolate vibrations. One conventional mount commonly employed to reduce vehicular vibrations is the hydraulic mount.

Conventional hydraulic mounts provide relatively low-damping, vibration-isolating characteristics (low dynamic rigidity), at vibrations of low amplitudes and high frequencies such as those generated by a running engine. These mounts also provide substantially increased-damping characteristics (high dynamic rigidity) at vibrations of high amplitudes and low frequencies such as those generated by running a vehicle on bumpy inconsistent road surfaces.

A hydraulic mount assembly of prior invention includes a reinforced, hollow rubber body that is closed by a resilient diaphragm so as to form a cavity. This cavity is partitioned by a plate into two chambers that are in fluid communication with each other through a relatively large decoupler orifice in the plate. A primary chamber is formed between the plate and the hollow rubber body. A secondary chamber is formed between the plate and the diaphragm.

A decoupler is positioned in the plate's decoupler orifice and reciprocates in response to vibrations so as to produce small volume changes in the two chambers. When, for example, the decoupler moves toward the diaphragm, the volume of the primary chamber increases and the volume of the secondary chamber decreases. In this way, at certain low vibratory amplitudes the major fluid flow is through the decoupler orifice so that the mount exhibits low dynamic rigidity to isolate engine vibrations and hydraulic damping is not provided.

In addition to the decoupler orifice, a smaller orifice track is provided which extends around the perimeter of the plate so as to have a large length-to-diameter ratio. Each end of the orifice track has an opening; one opening communicates with the primary chamber and the other with the secondary chamber. The orifice track provides the hydraulic mount assembly with a means of providing hydraulic damping for high dynamic rigidity at high amplitude vibrations where the decoupler operates to close the decoupler orifice. When combined, the oscillating decoupler and the orifice track provide at least two distinct dynamic modes of operation. The operating mode is primarily determined by the flow path of the fluid between the two chambers through either the decoupler orifice or the orifice track.

More specifically, small amplitude vibrating inputs, such as from the engine or the like, are isolated by the mount which exhibits low dynamic rigidity due to decoupling wherein, the decoupler floats as fluid exchange occurs through the decoupler orifice, as described above. On the other hand, large amplitude vibrating inputs force the decoupler against a plate closing the decoupler orifice to produce high velocity fluid flow through the orifice track, and accordingly, a high level of vibration damping force and high dynamic rigidity. In each instance, as the decoupler moves from one seated position to another, a relatively limited amount of fluid can bypass the orifice track by moving around the sides of the decoupler to provide limited help in smoothing the transition between the operational modes.

When fluid flows through a decoupler orifice or orifice track, flow rate is maximized at a specific frequency due to resonance. This resonance frequency is dependent on the flow area and the length of the flow path provided. A typical mount is designed to employ this physical characteristic to provide both low dynamic rigidity and high dynamic rigidity modes of operation at separate selected frequencies.

While the two distinct modes of operation provided by conventional hydraulic mounts provide generally satisfactory operation, they are not sufficient to furnish the desired maximum damping and noise suppression under all the continuously varying conditions encountered during vehicle operation. A noise problem is experienced as the decoupler moves during abrupt load changes and the accompanying mode transitions.

SUMMARY OF THE INVENTION

Conventional hydraulic mounts with both hard and flexible floating decouplers have a tendency to produce impulsive vibration as the mount is cycled at large amplitudes. This is due to the large dynamic rigidity change as fluid flow is stopped through the decoupler orifice and diverted through the orifice track. The rapid change in rigidity causes an impulsive vibration to be generated. This impulsive vibration produces rattling noises in vehicle structures in the 200 Hz to 500 Hz range. The present invention provides an orifice plate with multiple decoupler orifices of unequal area which significantly reduces abruptness of the load change as the decoupler closes off the decoupler orifices and fluid begins to flow through the orifice track at high amplitude displacements. Using multiple decoupler orifices of unequal area provides a means of controlling both the rapid rigidity transition and the amplitude of the impulsive vibration. This means of reducing impulsive vibration has lead to the reduction of noise in vehicle structures typically induced by the cycling of hydraulic mounts through mode transitions.

More specifically, decoupled hydraulic mounts have a potential to create noise due to their design. In operation, as a mount deflects the load starts out small at low displacement while fluid flows through the decoupler orifice between the primary and secondary chamber with very little restriction. The dynamic rigidity of a mount is low under this condition. For large displacements, the fluid pressure forces the decoupler to move far enough to close-off the flow fluid through the decoupler orifice. When this occurs, fluid is channeled through the smaller orifice track between the primary and secondary chamber which results in a large increase in dynamic rigidity due to the increased flow restriction and resonance.

It has been found that as a hydraulic mount with a decoupler is cycled at large displacements, the load change due to the transition from a low dynamic rigidity mode to a high dynamic rigidity mode creates an impulsive-type vibration. This vibration is transmitted through the mount's base plate and the attachment mechanism to the upper chamber. This transmitted impulsive vibration can cause undesirable noise in the form of knocking or rattling sounds in the structure attached to the mount.

The present invention presents a means of managing the load change during mode transitions in order to reduce the amplitude of vibration created by abrupt load changes. The abruptness of the load change is reduced by changing the geometry of the decoupler orifice between the primary and secondary chambers. This invention smooths the load change at high amplitude vibrations as the decoupler closes which stops fluid flow through the decoupler orifice and forces it through the orifice track.

The invention uses multiple decoupler orifices of unequal area for the decoupler orifice between the primary and secondary chambers. This reduces the mode transition vibration that is generated when the decoupler orifice is closed by as much as a factor of ten. This effects a reduction or elimination of the mode-transition noise radiated in the attached structure.

In replacing the conventional decoupler orifice with multiple orifices of unequal cross-sectional area, it has been found that the ratio of the cross-sectional area of a larger orifice to the cross-sectional area of a smaller orifice is a critical parameter in reducing the amplitude of the mode transition vibration generated. Generally, as the area ratio decreases the vibration amplitude generated by cycling the mount through a mode transition decreases and the noise in the attached structure decreases as a result. For one specific embodiment described herein, it has been found that the mode transition generated vibration is minimized when the area ratio is approximately 2:1. For a second specific embodiment described herein, it has been found that the mode transition generated vibration is minimized when the area ratio is approximately 1.5:1. However, the optimum area ratio for a given mount will depend upon the application.

It has been found that providing multiple decoupler orifices that are equal in size, but relatively small in area as compared to the prior art, the mode transition vibration generated is greatly reduced. However, the resonance frequency at which flow is maximized is relatively low. This causes the frequency dependent uncoupled dynamic rigidity to increase undesirably above that relatively low frequency. The use of multiple decoupler orifices of unequal size has been found to alleviate this shortcoming because the resonance frequency is optimized while the higher frequency dynamic rigidity is controlled or tuned.

With multiple decoupler orifices of unequal area, the area of a smaller orifice has an effect on the amount of mode transition vibration generated. As the area of a smaller orifice increases, there is a threshold at which the mode transition vibration amplitude begins to increase notably. Below the threshold the mode transition vibration amplitude is greatly reduced and changes very little as a function of smaller orifice area. Therefore, the optimum multiple decoupler orifice area ratio is established by first determining the smaller orifice area for reduced mode transition vibration generation in a given application. The larger orifice area is then selected to control the frequency dependent dynamic rigidity.

When using multiple central orifices of unequal area, the large orifice area controls the higher frequency dynamic rigidity of the mount due to the resonance effect. As the larger orifice area increases, the resonance frequency and therefore, the frequency at which dynamic rigidity begins to rise also increases. This determines the amount of uncoupled dynamic rigidity the mount will exhibit at a particular frequency. The uncoupled dynamic rigidity is a critical design parameter for low amplitude and high frequency vibration isolation.

The thickness or depth of a decoupler orifice also has an effect on the resonance frequency. As orifice thickness is increased, the resonance frequency is lower. This causes the uncoupled dynamic rigidity to increase. Therefore, decoupler orifice depth controls the amount of low frequency isolation that can be achieved in a given mount.

DETAILED DESCRIPTION OF THE PRESENTLY PREFERRED EMBODIMENT

Figure 1:
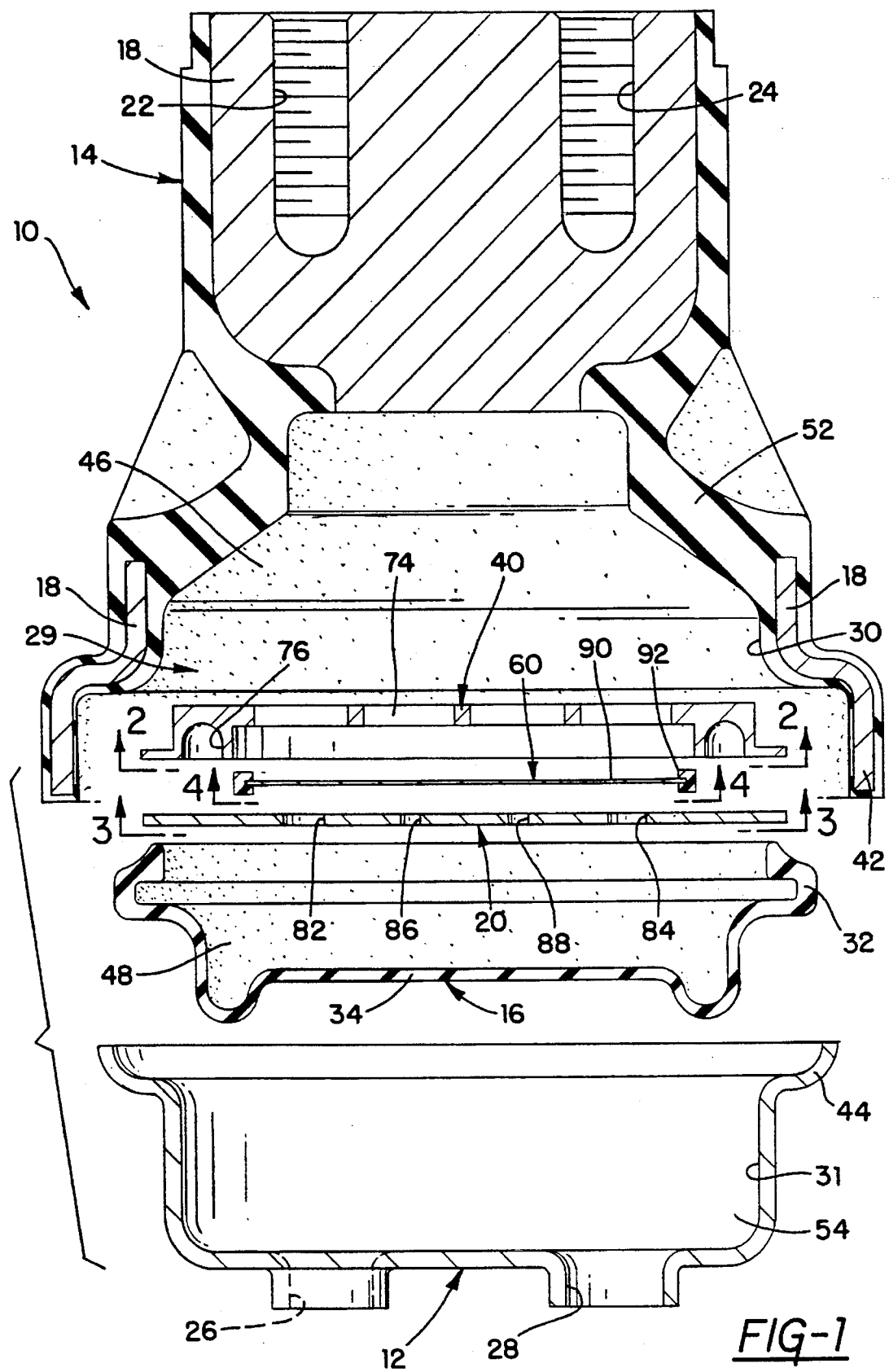
FIG. 1 is an exploded, sectional view of an engine mount according to the present invention.

Referring to the drawings, illustrated is a hydraulic mount incorporating a partition with an orifice plate according to the present invention. In FIG. 1, illustrated is a mount designated in the aggregate as 10. Mount 10 includes molding assembly 14 which is comprised of an elastomeric such as natural or synthetic rubber and includes inserts 18. Molding assembly 14 includes threaded holes 22 and 24 which serve as mounting points wherein molding assembly 14 provides a mounting member for the mount 10. Molding assembly 14 is adapted for crimped assembly onto base plate 12 which provides a second mounting member for mount 10. Base plate 12 includes two openings 26 and 28 for mounting purposes.

The molding assembly 14 and the base plate 12 are configured such that they essentially completely define a hollow cavity 29 between walls 30 and 31, in which diaphragm 16 cooperates with molding assembly 14 to positively prevent any leakage from the cavity 29 outwardly. The diaphragm 16 is formed of an elastomeric such as natural or synthetic rubber and has an rim section 32 and a spanning central portion 34. The rim portion 32 is flexible to receive the periphery of the partition assembly which includes upper orifice plate 40, decoupler 60 and lower orifice plate 20. During assembly, the periphery of the partition assembly is sandwiched between the flange 42 of the molding assembly 14 and the flange 44 of base plate 12. Flanges 42 and 44 are subsequently crimped together to secure the assembly.

When the mount 10 is assembled, cavity 29 is divided by the partition assembly into two chambers. A primary chamber 46 is enclosed between the molding assembly 14 and the partition assembly. A secondary chamber 48 is enclosed between the diaphragm 16 and the partition assembly. Prior to the closure of the cavity 29 at assembly, the primary and secondary chambers 46 and 48 are filled with a liquid (not illustrated), such as commercial engine anti-freeze coolant.

Assuming at this point that there is an orifice through the partition assembly interconnecting the chambers 46 and 48, liquid in the primary chamber 46 is forced to flow through such orifice at a restricted rate into the secondary chamber 48 upon compression of the primary chamber 46 and in the opposite direction on expansion thereof to thereby provide a damping effect. Upon compression of the primary chamber 46, the wall section 52 is initially caused to bulge outwardly while the liquid therein is subsequently forced to flow through the orifice into the chamber 48 to expand the latter as permitted by the elasticity of the diaphragm's central spanning portion 34. Upon a reversal in amplitude and the resultant expansion of the primary chamber 46, the stretched central spanning portion 34 self retracts and thereby contracts secondary chamber 48 forcing the liquid to flow back through the orifice into the primary chamber 46 to complete a damping cycle. To assure free expansion and contraction of the secondary chamber 48, the space 54 between the diaphragm 16 and the base plate 12 is vented to atmosphere.

Figure 2:
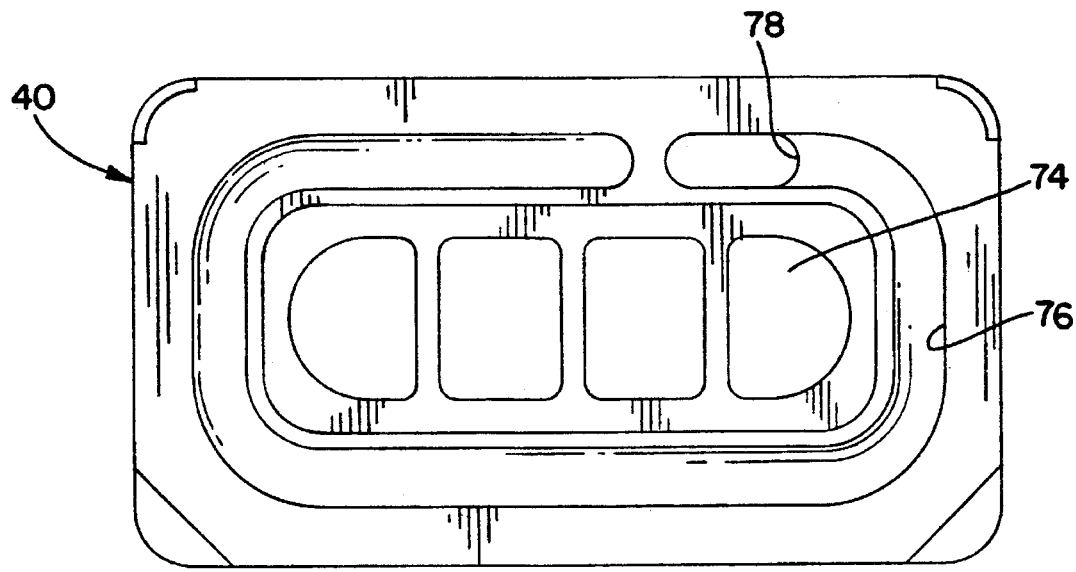
FIG. 2 is a detail illustration of a partition's upper plate.

Referring to FIG. 2, the partition assembly includes upper orifice plate 40 which exhibits a substantially open central portion 74 and an orifice track 76 which extends around the perimeter of the upper orifice plate 40. The orifice track portion includes port 78 which permits flow into and out of the orifice track 76 from the primary chamber 46.

Figure 3:
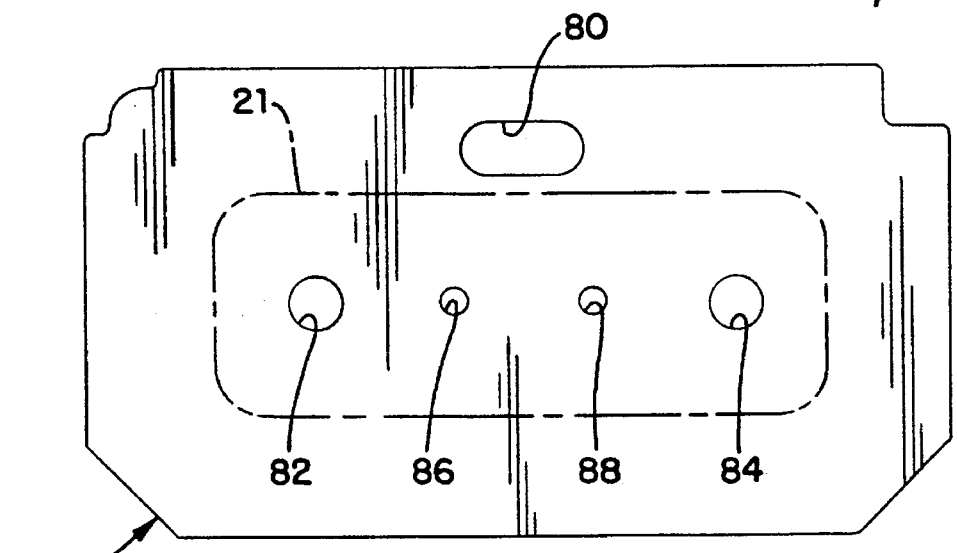
FIG. 3 is a detail illustration of a partition's lower plate.

Referring to FIG. 3, the partition assembly includes lower orifice plate 20 which is adapted to mate with upper orifice plate 40 and functions to enclose the length of orifice track 76. Lower orifice plate 20 is conventionally formed from rigid material, preferably steel and includes a zone 21 around the decoupler orifice area that is flat within 0.1 mm for interfacing with the decoupler.

Lower orifice plate 20 includes port 80 which provides an inlet and outlet between orifice track 76 and secondary chamber 48. Lower orifice plate 20 includes a decoupler orifice comprised of two larger orifices 82 and 84 and two smaller orifices 86 and 88.

Figure 4:
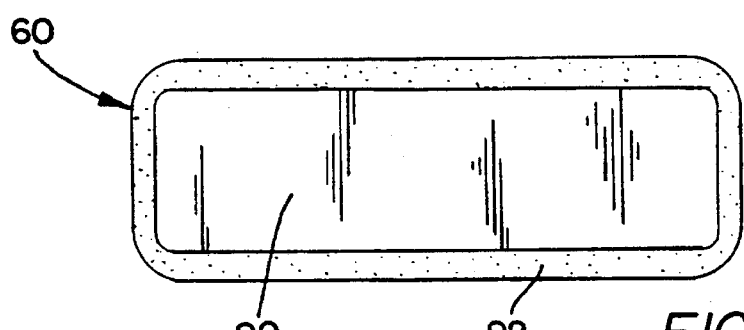
FIG. 4 is a detail illustration of a decoupler.

Referring to FIG. 4, adapted to be captured between upper orifice plate 40 and lower orifice plate 20 is decoupler 60. The decoupler 60 is a rectangular plate 90 may be formed of metal, as shown, or plastic and has a peripheral elastomeric combination seal and cushion 92 of natural or synthetic rubber molded thereto about the perimeter thereof. The decoupler 60 is mounted for limited up and down movement in a decoupler cavity formed between the assembled upper orifice plate 40 and lower orifice plate 20. The decoupler cavity is open to primary chamber 46 through the central portion 74 of upper orifice plate 40 and to secondary chamber 48 through the larger orifices 82 and 84 and the smaller orifices 86 and 88 of lower orifice plate 20.

Limited volume exchange in the chambers 46 and 48 to effect hydraulic decoupling (elimination of the hydraulic damping) below a prescribed low amplitude, generally at high frequencies, is provided by reciprocating movement of the decoupler 60 in response to alternating pressure buildups in the mount 10 acting on the opposite sides of the rectangular plate 90 which is free to travel between the orifice plates in response thereto. The combination seal and cushion 92 provides a seal against lower orifice plate 20 or upper orifice plate 40 to prevent flow between the primary chamber 46 and the secondary chamber 48 through the decoupler orifice area when the fluid exchange is significant enough to move the decoupler 60 against an orifice plate 20 or 40.

Referring to FIG. 3, the lower orifice plate 20 according to the present invention includes multiple orifices of unequal area. The two large orifices 82 and 84 each have a diameter of 5 mm. The two smaller orifices 86 and 88 each have a diameter of 2.5 mm. The ratio of the cross-sectional area of a larger orifice to the cross-sectional area of a smaller orifice is a critical design parameter to reducing the amplitude of the mode transition vibration generated when the decoupler 60 closes the decoupler orifice area. For the present embodiment it has been found that the optimum area ratio is approximately 2:1.

With the larger and smaller orifice design, the area of the small orifices 86 and 88 has an effect on the amount of mode transition vibration generated. Below a threshold size, the vibration amplitude is greatly reduced and does not change significantly if the small orifice size is varied below this threshold. Above the threshold size, the vibration amplitude increases. Therefore, in designing the lower orifice plate 20, the area of the small orifice is first determined for reduced mode transition vibration generation.

With the larger and smaller decoupler orifice design, the area of the larger orifices 82 and 84 has an effect on the higher frequency dynamic rigidity increase of the mount 10 due to the resonance frequency. The area of the larger orifices 82 and 84 substantially determines the amount of uncoupled dynamic rigidity the mount 10 has at a given frequency. Therefore, by varying the area of the larger orifices 82 and 84, the frequency dependent dynamic rigidity characteristics are optimized without sacrificing the minimization of the mode transition vibration amplitude that is generated. Once the area of the smaller orifices 86 and 88 and the area of the larger orifices 82 and 84 is established, the optimum area ratio is known. For this embodiment, the optimum area ratio for reduced mode-transition vibration noise generation is 2:1.

In operation, as the mount 10 deflects and the amplitude of the displacement is relatively small, such as less than ±1 mm, fluid flows back and forth through the decoupler orifice with very little restriction as the decoupler 60 floats. The dynamic rigidity of the mount 10 is low under this condition. Therefore, for certain small vibratory amplitudes which occur at generally higher frequencies, the decoupler 60 floats freely with the fluid movement between the upper orifice plate 40 and the lower orifice plate 20 providing a mount 10 with low dynamic rigidity and high vibration isolation.

For larger displacements caused by high amplitude vibrations, the fluid flow forces the decoupler 60 to move far enough to close-off the flow of fluid through the decoupler orifice between the primary chamber 46 and the secondary chamber 48 by positioning the combination seal and cushion 92 against an orifice plate 20 or 40. When the decoupler 60 closes off flow through the decoupler orifice, fluid flow is forced to move through the orifice track 76. This results in an large increase in the mount's dynamic rigidity due to the flow restriction and fluid resonance. Hydraulic damping is thereby provided for high vibratory amplitudes at low frequencies.

As the mount 10 is cycled at large displacements, the load change due to the mode transition from a low dynamic rigidity condition to a high dynamic rigidity condition is moderated by providing a decoupler orifice comprised of larger orifices 82 and 84 and smaller orifices 86 and 88. By providing larger orifices which, in this embodiment, have a flow area twice the size of the small orifices the amplitude of the mode transition vibration generated when the decoupler 60 closes the decoupler orifice is greatly reduced. Therefore the noise that had been conventionally produced thereby is minimized. Concurrently, the frequency dependent dynamic rigidity of the mount is optimized for the application. The optimum area ratio of larger to smaller orifices for the decoupler orifice is determined for each individual application but is always greater than 1:1.

Figure 5:
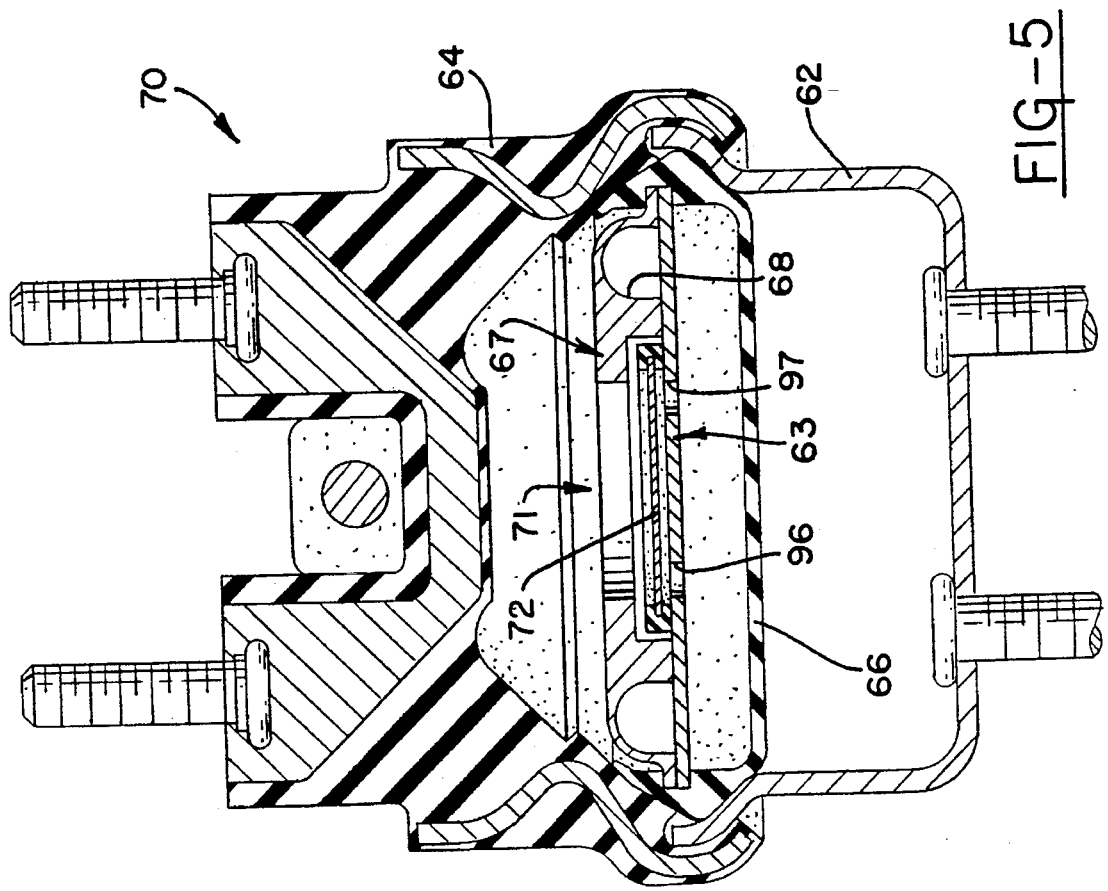
FIG. 5 is a sectional view of an engine mount according to the present invention.

FIG. 5 illustrates a hydraulic mount 70 incorporating a partition 71 with a lower orifice plate 63 according to the present invention. Mount 70 is constructed similarly to and operates like mount 10 as illustrated in FIG. 1. Mount 70 includes molding assembly 64 which is assembled to base plate 62 by crimping. Captured between molding assembly 64 and base plate 62 are partition 71 and diaphragm 66. Partition 71 includes upper orifice plate 67, lower orifice plate 63 and decoupler 72.

Figure 6:
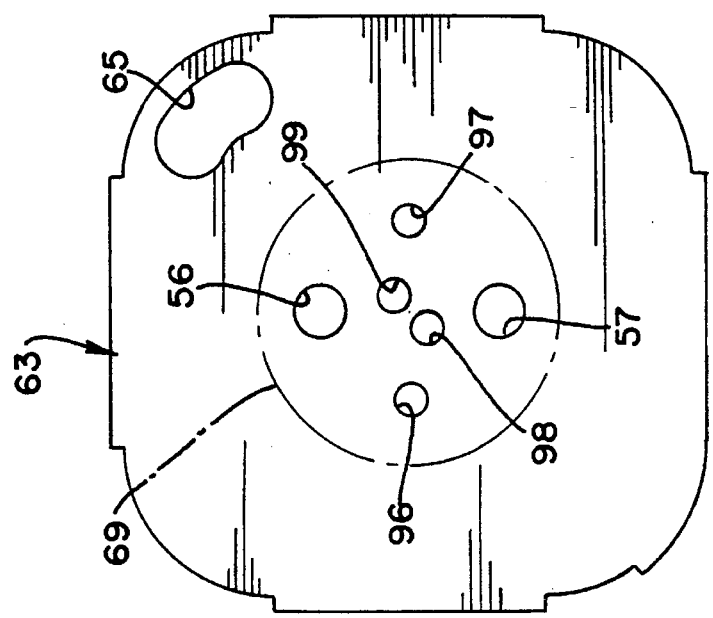
FIG. 6 is a detail illustration of the partition's lower plate shown in FIG. 5.

FIG. 6 illustrate lower orifice plate 63 in greater detail. Lower orifice plate 63 includes port 65 which provides an inlet and outlet to orifice track 68, as illustrated in FIG. 5. Lower orifice plate 63 is conventionally formed from rigid material and includes a flat zone 69 for interfacing with decoupler 72 of FIG. 5.

Lower orifice plate 63 includes a decoupler orifice comprised of two larger orifices 56 and 57 and four smaller orifices 96, 97, 98 and 99. For this embodiment it has been found that the optimum area ratio is approximately 1.5:1. The diameter of each larger orifice, 56 and 57, is 7.5 mm. The four smaller orifices, 96, 97, 98 and 99, each have a diameter of 5 mm.

What is claimed is:

1. A hydraulic mount comprising:

a first mounting member;

a second mounting member mating with the first mounting member forming a first cavity therebetween;

a resilient diaphragm cooperating with the first mounting member to form a second cavity that is filled with fluid; and a partition having a periphery captured between the first and second mounting members positioned within the second cavity including an orifice track extending through the partition from the first cavity to the second cavity and defined substantially around the periphery bounding the central area of the partition a first orifice plate having a substantially opened central flow area defined as the area bounded by the orifice track and a first orifice track port, a second orifice plate having a substantially closed central flow area with larger and smaller flow orifices of unequal flow area and a second orifice track port therethrough and a decoupler positioned between the first orifice plate and the second orifice plate, the first orifice plate and the second orifice plate forming the orifice track therebetween wherein the decoupler is capable of closing off flow through the central flow areas of the first and second orifice plates channeling flow through the orifice track resulting in a large increase in dynamic rigidity of the mount as the mount changes from a first mode wherein flow is through the central flow areas of the orifice plates and a second mode wherein flow is through the orifice track during which the substantially closed central flow area of the second orifice plate reduces mode transition vibration generation and the unequal flow area of the larger and smaller flow orifices result in optimization of a resonant frequency at which flow is maximized.

2. A hydraulic mount according to claim 1 wherein the area ratio of the larger flow orifices to the smaller flow orifices is within the range of 1:1 to 2:1.

3. A hydraulic mount according to claim 1 wherein the flow area of each larger flow orifice is at least twice the flow area of each smaller flow orifice.

4. A hydraulic mount comprising:

a first mounting member;

a second mounting member mating with the first mounting member, the first and second mounting members forming a first cavity therebetween;

a resilient diaphragm captured between the first and second mounting members and in cooperation with the first mounting member forming a second cavity therebetween that contains fluid;

a partition positioned within the second cavity including a decoupler orifice and an orifice track through which fluid flows between the first and the second cavities, a first plate being substantially open and a second plate being substantially closed so as to define the decoupled orifice thickness with two larger orifices extending therethrough each having a first resonance frequency, two smaller orifices extending therethrough each having a second resonance frequency and an orifice track port extending therethrough; and a decoupler movable between the first and second plates and operatively closing and opening both the larger and smaller orifices simultaneously by sealing against one of the first plate and the second plate.

5. A hydraulic mount according to claim 4 wherein the larger orifices have a first cross sectional area and the smaller orifices have a second cross sectional area and the ratio of the first cross sectional area to the second cross sectional area is within the range 1:1 to 2:1.

6. A hydraulic mount according to claim 4 wherein the second resonance frequency is such as to minimize vibration generation when the decoupler closes the larger and smaller orifices and the first resonance frequency is such as to optimize the hydraulic mount's dynamic rigidity when the decoupler opens the larger and smaller orifice wherein the larger orifices have a diameter of approximately 5 millimeters and the smaller orifices have a diameter of approximately 2.5 millimeters.

7. A hydraulic mount comprising:

a first mounting member;

a second mounting member mating with the first mounting member forming a first cavity therebetween;

a resilient diaphragm cooperating with the first mounting member to form a second cavity that is filled with fluid; and a partition having a periphery captured between the first and second mounting members positioned within the second cavity and separating a first chamber from a second chamber in the second cavity, the partition including an orifice track extending through the partition from the first chamber to the second chamber and defined substantially around the periphery bounding the central area of the partition, the partition including a first orifice plate having a substantially opened central flow area defined as the area bounded by the orifice track and a first orifice track port, a second orifice plate having a substantially closed central flow area with larger and smaller flow orifices of unequal flow area and a second orifice track port therethrough and a decoupler positioned between the first orifice plate and the second orifice plate, the first orifice plate and the second orifice plate forming the orifice track therebetween wherein the decoupler is capable of closing off flow through the central flow areas of the first and second orifice plates channeling flow through the orifice track resulting in a large increase in dynamic rigidity of the mount as the mount changes from a first mode wherein flow is through the central flow areas of the orifice plates and a second mode wherein flow is through the orifice track during which the substantially closed central flow area of the second orifice plate reduces mode transition vibration generation wherein a first area for the smaller flow orifices is selected equal, at most, to a threshold area below which the mode transition vibration is minimized, and wherein a second area for the larger flow orifices is selected that produces an optimized decoupled dynamic rigidity for the hydraulic mount and wherein the unequal flow areas of the larger and smaller flow orifices results in optimization of a resonant frequency at which flow is maximized.

\* \* \* \* \*